United States Patent
Kim et al.

(10) Patent No.: US 9,652,819 B2
(45) Date of Patent: May 16, 2017

(54) APPARATUS AND METHOD FOR GENERATING MULTI-VIEWPOINT IMAGE

(71) Applicant: Electronics and Telecommunications Research Institute, Daejeon (KR)

(72) Inventors: Yoo Kyung Kim, Daejeon (KR); Gi Mun Um, Daejeon (KR); Il Gu Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 49 days.

(21) Appl. No.: 14/719,929

(22) Filed: May 22, 2015

(65) Prior Publication Data

US 2016/0155019 A1    Jun. 2, 2016

(30) Foreign Application Priority Data

Nov. 27, 2014   (KR) .................. 10-2014-0167557

(51) Int. Cl.
   *G06K 9/00*    (2006.01)
   *G06T 3/00*    (2006.01)
   *G06T 7/00*    (2017.01)

(52) U.S. Cl.
   CPC .................. *G06T 3/00* (2013.01); *G06T 7/97* (2017.01); *G06T 2207/10012* (2013.01); *G06T 2207/20228* (2013.01)

(58) Field of Classification Search
   CPC ....................................................... G06T 3/00
   USPC ....................................................... 382/154
   See application file for complete search history.

(56) References Cited

U.S. PATENT DOCUMENTS

| | | | |
|---|---|---|---|
| 2002/0080143 A1* | 6/2002 | Morgan | G06T 17/00 345/581 |
| 2002/0180748 A1* | 12/2002 | Popescu | G06T 15/205 345/582 |
| 2008/0101711 A1* | 5/2008 | Kalker | G06T 3/00 382/254 |
| 2011/0109720 A1* | 5/2011 | Smolic | H04N 13/0011 348/43 |

(Continued)

FOREIGN PATENT DOCUMENTS

| | | |
|---|---|---|
| JP | 2003-141549 A | 5/2003 |
| KR | 10-2009-0050783 A | 5/2009 |

OTHER PUBLICATIONS

Lang, M. et al., Non-linear Disparity Mapping for Stereoscopic 3D, ACM Transactions on Graphics, SIGGRAPH 2010, vol. 29, No. 4, pp. 1-10.

*Primary Examiner* — John Strege
(74) *Attorney, Agent, or Firm* — Nelson Mullins Riley & Scarborough LLP; Anthony A. Laurentano (57) ABSTRACT

Provided are an apparatus and a method for generating a multi-viewpoint image. The apparatus includes: a camera photographing a stereo image; an image processing unit detecting features from left and right images of the stereo image; a reference image generating unit generating a reference image for viewpoint n by warping an image which is distant between the left image and the right image at viewpoint n based on an n-th viewpoint among N viewpoints that exist between the left image and the right image; and a warping image generating unit calculating a warping equation for viewpoint n by using the reference image and generating a final warping image for viewpoint n by using the calculated warping equation.

12 Claims, 7 Drawing Sheets

(56) References Cited

U.S. PATENT DOCUMENTS

| | | | |
|---|---|---|---|
| 2011/0234769 A1 | 9/2011 | Bang et al. | |
| 2012/0154533 A1 | 6/2012 | Shin et al. | |
| 2013/0057644 A1* | 3/2013 | Stefanoski | G06T 5/50 348/42 |
| 2013/0127988 A1* | 5/2013 | Wang | G06T 15/205 348/43 |
| 2014/0333739 A1* | 11/2014 | Yang | H04N 13/0011 348/54 |
| 2014/0347452 A1* | 11/2014 | Smolic | H04N 13/0011 348/54 |

* cited by examiner

310
- CORRESPONDENCE POINT MAINTAINING DEGREE
- MESH TRANSFORMATION DEGREE
- EDGE SHAPE MAINTAINING DEGREE
- VIEWPOINT CONSISTENCY
- SIMILARITY TO REFERENCE IMAGE

APPARATUS AND METHOD FOR GENERATING MULTI-VIEWPOINT IMAGE

CROSS-REFERENCE TO RELATED APPLICATIONS

This application claims priority to and the benefit of Korean Patent Application No. 10-2014-0167557 filed in the Korean Intellectual Property Office on Nov. 27, 2014, the entire contents of which are incorporated herein by reference.

TECHNICAL FIELD

The present invention relates to an apparatus and a method for generating a multi-viewpoint image, and particularly, to technology that generates a consecutive viewpoint image in which switching multi-viewpoint images is natural by using stereo image warping.

BACKGROUND ART

There is a technique that generates a multi-viewpoint image by calculating a disparity from a stereo image by a stereo matching technique, and the like and generating an intermediate image by using the disparity information.

In recent years, has been disclosed an image warping based multi-viewpoint image generating technique that generates a multi-viewpoint image by mesh grid based image warping type calculation to minimize an energy function defined by calculating disparity information only for a partial area of the image through calculation of a feature disparity/optical flow in the stereo image, defining each item of an energy function by using a restriction condition defined as image saliency and image edge components, and weight combining the respective items.

However, a phenomenon occurs, in which distortion of an entire image is crude by warping at the time of generating the multi-viewpoint image by the warping by using the aforementioned technique, and as a result, person objects are dropped and bent to increase inaccuracy of the multi-viewpoint image. Further, a position and a degree in which the distortion occurs vary for each multi-viewpoint image. This generates the distortion be further remarkable at the time of sequentially reproducing the multi-viewpoint images. In particular, in an existing method that generates an intermediate viewpoint image by using an image in a close direction between left and right images, a remarkable difference occurs between the intermediate viewpoint images positioned at the center by a difference of the left and right images. This has a disadvantage of degrading reliability of the multi-viewpoint image and concentrativeness of a viewer at the time of switching the multi-viewpoint images.

Accordingly, a similarity between contiguous viewpoint images is increased so that switching the multi-viewpoint images is natural at the time of generating the multi-viewpoint image and the direction of the distortion is consistent and a degree of the distortion needs to be evenly distributed among the multi-viewpoint images so that the distortion which occurs in the multi-viewpoint images while warping the image is natural from the viewer side.

SUMMARY OF THE INVENTION

The present invention has been generated in an effort to provide an apparatus and a method for generating a multi-viewpoint image that evenly distribute distortion among consecutive viewpoint images for a stereo image and increase a similarity between the respective viewpoint images to naturally switch the consecutive viewpoint images.

The present invention has also been generated in an effort to provide an apparatus and a method for generating a multi-viewpoint image that generate an intermediate viewpoint image by considering both a left image and a right image of a stereo image.

An exemplary embodiment of the present invention provides an apparatus for generating a multi-viewpoint image including: a camera photographing a stereo image; an image processing unit detecting features from left and right images of the stereo image; a reference image generating unit generating a reference image for viewpoint n by warping an image which is distant between the left image and the right image at viewpoint n based on an n-th viewpoint among N viewpoints that exist between the left image and the right image based on a feature detected between the left image and the right image; and a warping image generating unit calculating a warping equation for viewpoint n by using the reference image and generating a final warping image for viewpoint n by using the calculated warping equation.

The warping image generating unit may warp an image which is close between the left image and the right image at viewpoint n based on the warping equation in terms of viewpoint n based on the feature detected between the left image and the right image to generate the final warping image for viewpoint n.

The reference image generating unit may generate an n-viewpoint reference image by using the left image when a relative distance between a position at viewpoint n and the left image is more than 0.5 and generate the n-viewpoint reference image by using the right image when a relative distance between the position at viewpoint n and the right image is more than 0.5 in the case where a relative distance between the left image and the right image is 1.

The warping image generating unit may generate an n-viewpoint final warping image by using the left image when the relative distance between the position at viewpoint n and the left image is less than 0.5 and generate the n-viewpoint final warping image by using the right image when the relative distance between the position at viewpoint n and the right image is less than 0.5 in the case where the relative distance between the left image and the right image is 1.

The warping image generating unit may set a warping constraint for viewpoint n by using the n-viewpoint reference image and determine a warping equation by reflecting the set warping constraint.

The warping constraint may include at least one of a transformation degree of meshes calculated from an image which is close from viewpoint n between the left image and the right image, a maintaining degree of correspondence points at the time of warping the corresponding image, a maintaining degree for a spot of an edge area calculated from the corresponding image, temporal consistency at the time of warping the corresponding image, and a similarity between the n-viewpoint reference image and an image after warping.

The image processing unit may calculate a disparity between the features of the left image and the right image.

The image processing unit may segment at least one of the left image and the right image into mesh grid units and extract at least one information of a spot, a line, and a plane for each segmented mesh.

The image processing unit may detect an edge area from at last one of the left image and the right image to extract line and spot information of the edge area.

Another exemplary embodiment of the present invention provides a method for generating a multi-viewpoint image including: detecting, when a stereo image is input, features from a left image and a right image of the stereo image; generating a reference image for viewpoint n by warping an image which is distant between the left image and the right image at viewpoint n based on an n-th viewpoint among N viewpoints that exist between the left image and the right image based on a feature detected between the left image and the right image; calculating a warping equation for viewpoint n by using the reference image; and warping an image which is close between the left image and the right image at viewpoint n based on the warping equation in terms of viewpoint n based on the feature detected between the left image and the right image to generate a final warping image for viewpoint n.

In the generating of the reference image for viewpoint n, an n-viewpoint reference image may be generated by using the left image when a relative distance between a position at viewpoint n and the left image is more than 0.5 and an n-viewpoint reference image may be generated by using the right image when a relative distance between the position at viewpoint n and the right image is more than 0.5 in the case where a relative distance between the left image and the right image is 1.

In the generating of the final warping image, an n-viewpoint final warping image may be generated by using the left image when the relative distance between the position at viewpoint n and the left image is less than 0.5 and an n-viewpoint final warping image may be generated by using the right image when the relative distance between the position at viewpoint n and the right image is less than 0.5 in the case where the relative distance between the left image and the right image is 1.

The calculating of the warping equation for viewpoint n may include setting a warping constraint for viewpoint n by using the n-viewpoint reference image, and the warping equation may be determined by reflecting the set warping constraint.

The warping constraint may include at least one of a transformation degree of meshes calculated from an image which is close from viewpoint n between the left image and the right image, a maintaining degree of correspondence points at the time of warping the corresponding image, a maintaining degree for a feature of an edge area calculated from the corresponding image, temporal consistency at the time of warping the corresponding warping, and a similarity between the n-viewpoint reference image and an image after warping.

The detecting of the features may include calculating a disparity between the features of the left image and the right image, segmenting at least one of the left image and the right image into mesh grid units and extracting at least one information of a spot, a line, and a plane for each segmented mesh, and detecting an edge area from at last one of the left image and the right image to extract line and spot information of the edge area.

According to exemplary embodiments of the present invention, distortion among consecutive viewpoint images for a stereo image is evenly distributed and a similarity is increased between the respective viewpoint images to naturally switch the consecutive viewpoint images.

According to the present invention, a difference between intermediate viewpoint images is decreased by considering both a left image and a right image of the stereo image, and as a result, a rapid change among the intermediate viewpoint images which occurs at the time of switching a viewpoint can be decreased due to a difference between the left image and the right image. Further, a ghost phenomenon can be prevented from occurring, in which two images overlap with each other as compared with a blending scheme which is an existing multi-viewpoint image generating postprocessing scheme.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

In multiple drawings, like reference numerals refer to like elements.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is noted that technical terms used in the specification are used to just describe a specific exemplary embodiment and do not intend to limit the present invention. Further, unless otherwise defined, the technical terms used in the specification should be interpreted as meanings generally appreciated by those skilled in the art and should not be interpreted as excessively comprehensive meanings or excessively reduced meanings. Further, when the technical term used in the specification is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Unless otherwise apparently specified contextually, a singular expression used in the specification includes a plural expression. In the specification, a term such as "comprising" or "including" should not be interpreted as necessarily including all various components or various steps disclosed in the specification, and it should be interpreted that some component or some steps among them may not be included or additional components or steps may be further included.

Terms including ordinal numbers, such as 'first' and 'second', used in the specification can be used to describe components, but the components should not be limited by the terms. The above terms are used only for distinguishing one component from the other component. For example, a first component may be named a second component and similarly, the second component may also be named the first component, without departing from the scope of the present invention.

Hereinafter, exemplary embodiments of the present invention will be described in detail with reference to the accompanying drawings, in which like reference numerals refer to like or similar elements regardless of reference numerals and a duplicated description thereof will be omitted.

In describing the present invention, when it is determined that the detailed description of the publicly known art related to the present invention may obscure the gist of the present invention, the detailed description thereof will be omitted. Further, it is noted that the accompanying drawings are only for easily understanding the spirit of the present invention and it should not be interpreted that the spirit of the present invention is limited by the accompanying drawings.

Figure 1:
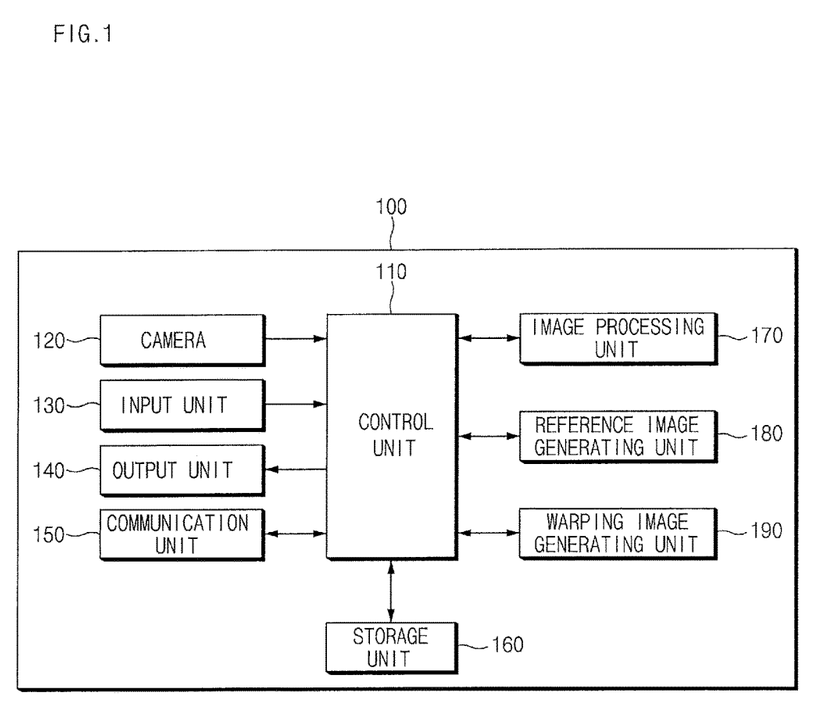
FIG. 1 is a block diagram illustrating a configuration of an apparatus for generating a multi-viewpoint image according to an exemplary embodiment of the present invention.

FIG. 1 is a block diagram illustrating a configuration of an apparatus for generating a multi-viewpoint image according to an exemplary embodiment of the present invention.

An apparatus 100 for generating a multi-viewpoint image according to the present invention may be implemented at any place to which a stereo camera or a multi-viewpoint camera is applied.

Therefore, referring to FIG. 1, the apparatus 100 for generating a multi-viewpoint image may include a control unit 110, a camera 120, an input unit 130, an output unit 140, a communication unit 150, a storage unit 160, an image processing unit 170, a reference image generating unit 180, and a warping image generating unit 190. Herein, the control unit 110 may process signals transferred among the respective units of the apparatus 100 for generating a multi-viewpoint image.

The camera 120 is a device that photographs an image and the image photographed by the camera 120 may be transferred to at least one of the image processing unit 170, the reference image generating unit 180, and the warping value calculating unit through the control unit 110.

In this case, the camera 120 may be implemented as the stereo camera or the multi-viewpoint camera. Herein, the camera 120 may be formed integrally with the internal control units of the apparatus 100 for generating a multi-viewpoint image and is implemented as a separate device to be connected to the internal control units of the apparatus 100 for generating a multi-viewpoint image by a separate connection means outside the apparatus 100 for generating a multi-viewpoint image. Meanwhile, the camera 120 may be a singe-viewpoint camera and in this case, a plurality of single-viewpoint cameras is provided.

In the present invention, the exemplary embodiment is described by assuming that the camera 120 photographs the stereo image for two viewpoints, but the present invention is not limited thereto. The exemplary embodiment will be described by assuming that the stereo image photographed by the camera 120 includes a left image and a right image for easy description.

The input unit 130 is a means for receiving a control command from a user and a key button implemented outside the apparatus 100 for generating a multi-viewpoint image may correspond to the input unit 130 and a soft key implemented on the apparatus 100 for generating a multi-viewpoint image or a display provided in a vehicle may correspond to the input unit 130. Further, the input unit 130 may be an input means of a type such as a mouse, a joystick, a jog shuttle, or a stylus pen.

The output unit 140 may include a display on which an operating status and an operating result of the apparatus 100 for generating a multi-viewpoint image are displayed and include a speaker that guides the operating status and the operating result through a voice.

Herein, when the display includes a sensor sensing a touch operation, the display may be used as an input device in addition to an output device. That is, when a touch sensor such as a touch film, a touch sheet, a touch pad, or the like is provided in the display, the display may operate as a touch screen and may be implemented as a type in which the input unit 130 and the output unit 140 are integrated with each other.

In this case, the display may include at least one of a liquid crystal display (LCD), a thin film transistor-liquid crystal display (TFT LCD), an organic light-emitting diode (OLED), a flexible display, a field emission display (FED), and a 3D display.

The display may be an apparatus that is implemented separately from the apparatus 100 for generating a multi-viewpoint image and connected with the apparatus 100 for generating a multi-viewpoint image outside.

The communication unit 150 may include a communication module that supports a communication interface with external apparatuses. As one example, the communication module may be a module for wireless Internet connection or a module for short range communication. Herein, wireless Internet technology may include a wireless LAN (WLAN), a wireless broadband (Wibro), Wi-Fi, World Interoperability for Microwave Access (Wimax), high speed downlink packet access (HSDPA), and the like and further, the short range communication technology may include Bluetooth, ZigBee, ultra wideband (UWB), radio frequency identification (RFID), infrared data association (IrDA), and the like. Further, the wired communication technology may include universal serial bus (USB) communication, and the like.

Meanwhile, when the apparatus 100 for generating a multi-viewpoint image is provided in a vehicle, the communication unit 150 may include a communication module that supports vehicle network communication such as controller area network (CAN) communication, local interconnect network (LIN) communication, flex-ray communication, and the like.

The storage unit 160 may store data and a program required for operating the apparatus 100 for generating a multi-viewpoint image. The storage unit 160 may store a setup value for operating the apparatus 100 for generating a multi-viewpoint image. As one example, the storage unit 160 may store a reference value, an operating condition, and a command for controlling each operation which are predefined to perform extraction of a feature from the multi-viewpoint image, calculation of a disparity, generating of a reference image, image warping, and the like. Further, the storage unit 160 may store an algorithm for performing each operation.

Herein, the storage unit 160 may include at least one storage medium of a flash memory type, a hard disk type, a multimedia card micro type, a card type memory (for example, an SD or XD memory), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM).

When the image processing unit 170 receives the stereo image, that is, the left image and the right image from the camera 120, the image processing unit 170 extracts features from the received left image and right image to calculate a disparity between the features. In this case, the image processing unit 170 may extract the features for the left image and the right image by applying a feature extraction technique such as scale invariant feature transform (SIFT) and calculate the disparity between the extracted features.

The image processing unit 170 generates the left and right images into low-resolution images and calculates an optical flow between the low-resolution images to calculate the disparity between the left image and the right image. In this case, the image processing unit 170 combines the calculated disparity with the disparity between the features and removes an outlier to calculate a sparse disparity of a scene having high accuracy.

Meanwhile, the image processing unit 170 may configure a mesh for generating a warping image by using the left image and the right image. In this case, the image processing unit 170 may segment any one input image of the left image and the right image into mesh units and extract feature information regarding each segmented mesh, for example, information on a spot, a line, and a plane. Herein, the feature information of each mesh, which is extracted by the image processing unit 170 is stored in the storage unit to be used at the time of generating the warping image afterward.

The image processing unit 170 may detect edges from the left image and the right image. Herein, in the case of the edges, a vertical line, a specific-direction line, or a curved line may be set to be concentratively detected according to an importance.

The reference image generating unit 180 generates the reference image for an n viewpoint by using any one of the left image and the right image. Herein, the reference image generating unit 180 may generate the reference image for the n viewpoint based on a long-distance image which is distant between the left image and the right image based on the n viewpoint.

As one example, when a relative distance between the left image and the right image is 1, the reference image generating unit 180 determines the left image as a short-range image and the right image as a long-range image when a relative distance between an n-viewpoint position and the left image is less than 0.5 and generates the reference image for the n viewpoint by using the right image which is the long-range image. Meanwhile, when a relative distance between an n+1 viewpoint position and the left image is more than 0.5, the reference image generating unit 180 determines the left image as the long-range image and the right image as the short-range image, and generates a reference image for an n+1 viewpoint by using the left image which is the long-range image.

Herein, the reference image for the n viewpoint is an image acquired by warping the long-range image based on the n viewpoint.

Therefore, an operation of generating the reference image in the reference image generating unit 180 will be described in detail with reference to an exemplary embodiment of FIG. 2.

Figure 2:
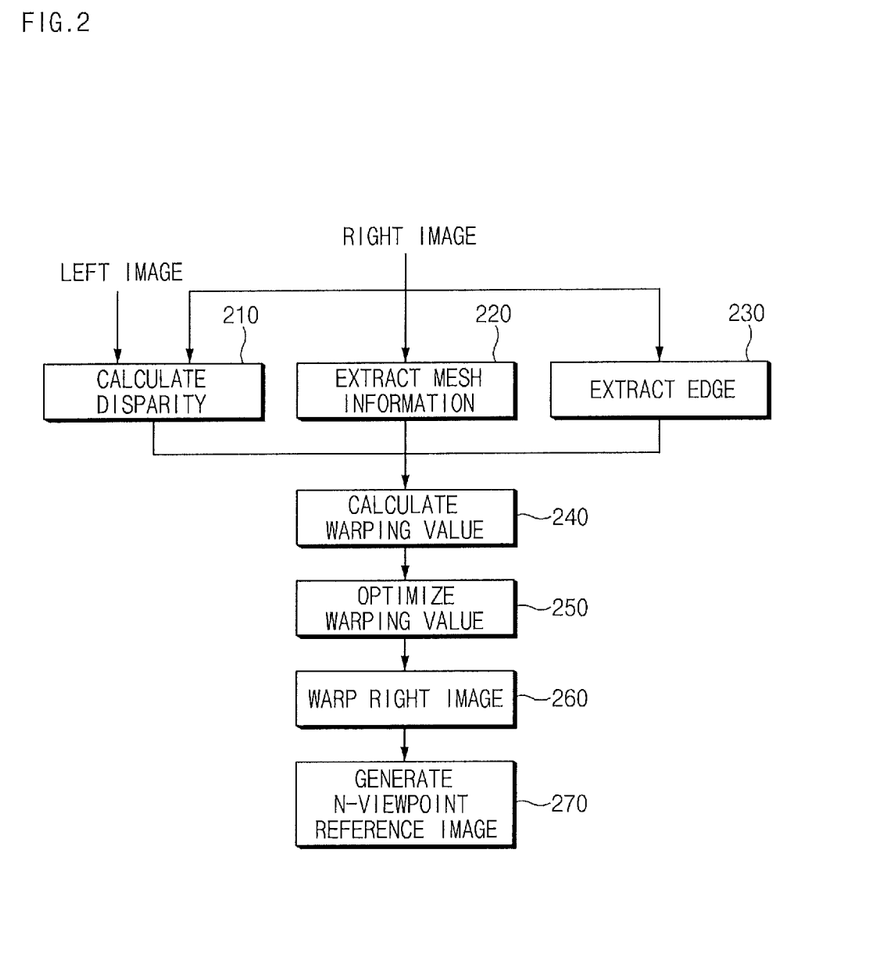
FIG. 2 is an exemplary diagram referred to in describing a detailed operation of a reference image generating unit of FIG. 1.

The exemplary embodiment of FIG. 2 illustrates an operation of generating the reference image for the n viewpoint based on the right image. As illustrated in FIG. 2, the reference image generating unit 180 may calculate the disparity by detecting the feature between the right image and the left image as described in operation 210 in order to generate the n-viewpoint reference image by using the right image. Further, the reference image generating unit 180 may segment the right image into mesh grid units in order to warp the right image to a mesh grid unit and extract information regarding feature information (spot, line, plane, and the like) for each segmented mesh, as described in operation 220. In addition, the reference image generating unit 180 may detect edges from the right image as described in operation 230.

Herein, operations 210 to 230 may be performed by the reference image generating unit 180, but according to the exemplary embodiment, the image processing unit 170 may perform operations 210 to 230 and the reference image generating unit 180 may receive and process an operation performing result from the image processing unit 170.

In this case, the reference image generating unit 180 calculates a warping value for warping the right image to the n-viewpoint image as described in operation 240 and as described in operation 250, optimizes the warping value by applying disparity information between the features extracted through operations 210 to 230, mesh information, and edge information. As one example, the reference image generating unit 180 may optimize the warping value by using a nonlinear least-squares optimization technique and in detail, optimize the warping value by applying QR decomposition, singular value decomposition, and the like.

Last, the reference image generating unit 180 warps the right image to the n viewpoint by using the warping value optimized through operation 250 as described in operations 260 and 370 to generate the n-viewpoint reference image.

Herein, the reference image generating unit 180 may generate the reference image for each viewpoint between the left image and the right image by the aforementioned method.

The warping image generating unit 190 reflects the reference image for each viewpoint generated through the reference image generating unit 180 to generate a final warping image for each viewpoint.

In other words, the warping image generating unit 190 sets a warping constraint so as to output a warping result similar to the reference image for the corresponding viewpoint by using the reference image for each viewpoint and redetermines a warping value for generating the final warping image by reflecting the set warping constraint.

Figure 3:
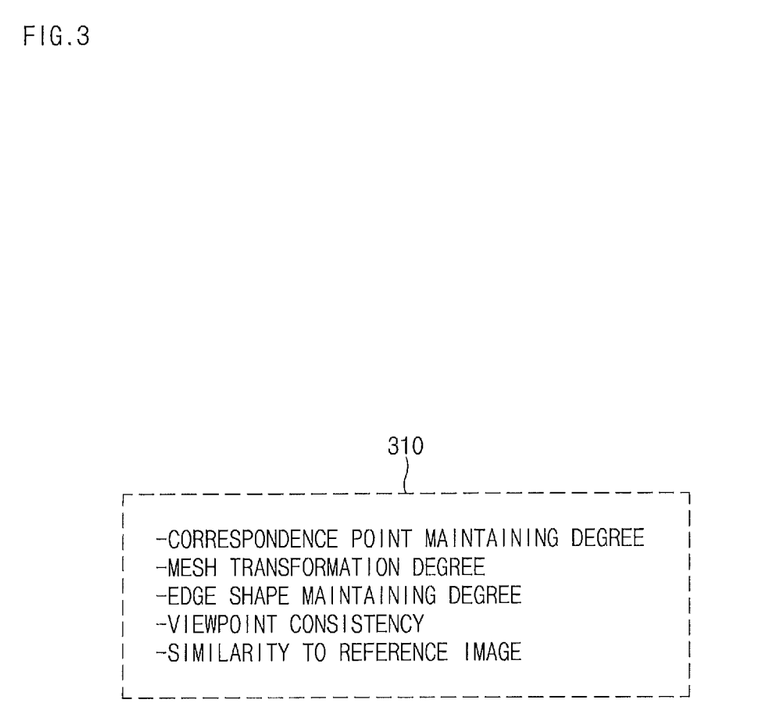
FIG. 3 is an exemplary diagram referred to in describing a warping value optimizing operation of the apparatus for generating a multi-viewpoint image according to the exemplary embodiment of the present invention.

Herein, the warping image generating unit 190 may set a warping constraint 310 based on an inter-feature correspondence point maintaining degree, a transformation degree for meshes, a shape maintaining degree of an edge area after warping, viewpoint consistency, and a similarity for the reference image as illustrated in FIG. 3.

A warping value $E_w$ reflecting the warping constraint 310 may be calculated by using [Equation 1] given below.

$$E_w = \lambda_c E_c + \lambda_f E_f + \lambda_t E_t + \lambda_h E_h + \lambda_v E_v \quad \text{[Equation 1]}$$

Herein, Ec represents a constraint representing a transformation degree for meshes calculated from an input image, Ef represents a constraint representing a maintenance degree of a correspondence point at the time of warping correspondence points calculated from the input image, Et represents a constraint for decreasing a temporal artifact on a time axis at the time of processing a video sequence, Eh represents a constraint representing a degree in which spots on the edge calculated from the input image exist on the same edge even after warping, Ev represents a constraint representing a similarity between the reference image and the image after warping, and λc, λf, λt, λh, and λv represent Lagrangian constants to determine an importance for respective energy terms.

Herein, Et represents a comparison of a similarity between a current-frame image and a previous-frame image for the same intermediate viewpoint position and according to the exemplary embodiment, a temporal consistency constraint per sequence may be added.

It is assumed that the sum of λc, λf, λt, λh, and λv becomes 1 and when a larger penalty for the corresponding constraint is intended to be granted, a larger Lagrangian constant of the corresponding constraint may be granted. As one example, when λv is determined to be high, a warping equation of the final warping image is determined with a higher similarity to the reference image to acquire a more similar image to the reference image.

As such, when a weight of the Lagrangian constant varies according to the importance of the constraint applied to the warping equation, the final warping image to which the corresponding constraint is significantly reflected may be acquired. Therefore, the weight of the Lagrangian constant may be selectively differently granted according to the exemplary embodiment.

Ev represents a constraint representing a similarity between the reference image and the image after warping as mentioned above and Ev may be calculated through [Equation 2] given below.

$$E_v = \sum_{all\ features} \|W_{L \to n}(L) - W_{R \to n}(R)\|^2 \quad \text{[Equation 2]}$$

Herein, $W_{(L \to n)}(L)$ represents the final warping image warped to viewpoint n in the left image and $W_{(R \to n)}(R)$ represents the reference image warped to viewpoint n in the right image. In this case, Ev may be calculated from a value acquired by calculating differences of features to which a disparity between the final warping image $W_{(L \to n)}(L)$ for viewpoint n and the reference image $W_{(R \to n)}(R)$ is given and summing up the differences.

As described above, the warping image generating unit 190 may redetermine the warping value based on the reference image for the corresponding viewpoint and optimize the redetermined warping value by using a nonlinear least-squares optimization technique. In this case, the warping image generating unit 190 generates the final warping image for the corresponding viewpoint by using the redetermined warping value.

Herein, the warping image generating unit 190 generates the final warping image for viewpoint n based on a short-range image which is close between the left image and the right image based on viewpoint n unlike the reference image generating unit 180.

As one example, when the relative distance between the left image and the right image is 1, the warping image generating unit 190 determines the left image as the short-range image and the right image as the long-range image when the relative distance between the n-viewpoint position and the left image is less than 0.5 and generates the final warping image for viewpoint n by using the left image which is the short-range image. Meanwhile, when the relative distance between the n+1 viewpoint position and the left image is more than 0.5, the warping image generating unit 190 determines the left image as the long-range image and the right image as the short-range image, and generates the final warping image for viewpoint n+1 by using the right image which is the short-range image.

The warping image generating unit 190 may generate the final warping image for each viewpoint between the left image and the right image by the aforementioned method. Herein, the warping image generating unit 190 may generate the final warping image for the corresponding viewpoint based on the left image which is the short-range image with respect to viewpoints 1 to n and the final warping image for the corresponding viewpoint based on the right image which is the short-range image with respect to viewpoints n+1 to N.

In this case, the final warping image for each viewpoint is generated by using the short-range image between the left image and the right image based on the corresponding viewpoint, but since the warping value for generating the final warping image is recalculated by reflecting the information on the reference image of the corresponding viewpoint generated by using the long-range image, the final warping image for each viewpoint may be naturally switched with respect to both the left image and the right image.

Figure 4:
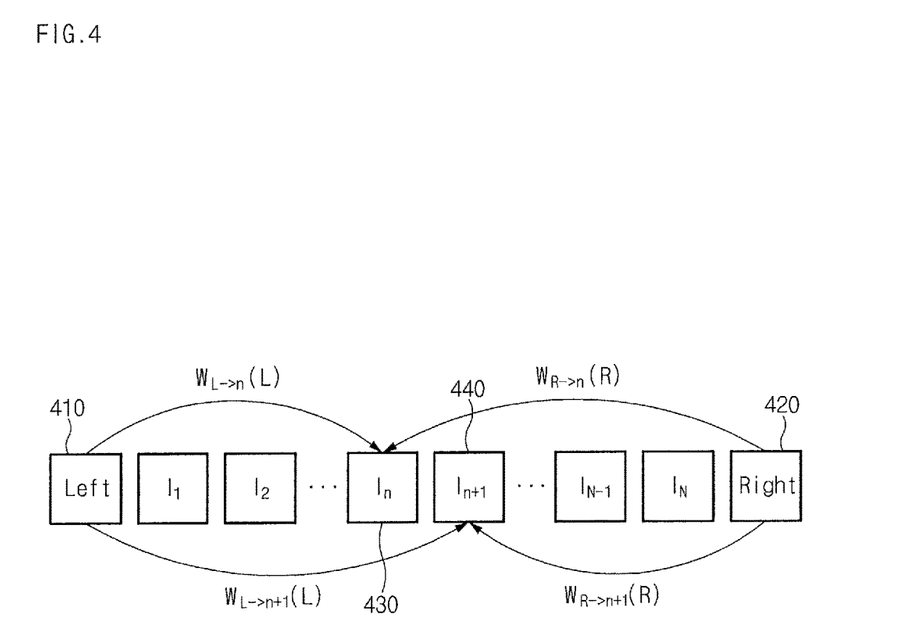
FIG. 4 is an exemplary diagram referred to in describing a consecutive viewpoint image generating operation of the apparatus for generating a multi-viewpoint image according to the exemplary embodiment of the present invention.

FIG. 4 is an exemplary diagram referred to in describing a consecutive viewpoint image generating operation of the apparatus for generating a multi-viewpoint image according to the exemplary embodiment of the present invention.

Referring to FIG. 4, the apparatus for generating a multi-viewpoint image receives a left image 410 and a right image 420 as input images and thereafter, generates images for consecutive viewpoints between the left image 410 and the right image 420 by using the left image 410 and the right image 420.

Herein, it is assumed that viewpoint n and viewpoint n+1 are intermediate viewpoints of a left image 210 and a right image 220. In this case, when a relative distance between the left image 410 and the right image 420 is set to 1, a relative distance between a position at viewpoint n and the left image 410 is less than 0.5, and as a result, at viewpoints 1 to n, the left image 410 may be determined as the short-range image and the right image 420 may be determined as the long-range image. Meanwhile, since a relative distance between a position at viewpoint n+1 and the right image 420 is less than 0.5, the right image 420 may be determined as the short-range image and the left image 410 may be determined as the long-range image at viewpoints n+1 to N.

Therefore, the apparatus for generating a multi-viewpoint image warps the right image 420 which is the long-range image at viewpoint n to generate an n-viewpoint reference image ($W_{R \to n}(R)$) and warps the left image 410 which is the short-range image at viewpoint n to generate an n-viewpoint warping image ($W_{L-n}(L)$), based on viewpoint n. In this case, the apparatus for generating a multi-viewpoint image sets a warping constraint for generating the n-viewpoint warping image ($W_{L-n}(L)$) based on the n-viewpoint reference image ($W_{R \to n}(R)$) and generates the n-viewpoint warping image ($W_{L-n}(L)$) by using a warping equation determined based thereon. Herein, the apparatus for generating a multi-viewpoint image determines a finally generated n-viewpoint warping image ($W_{L-n}(L)$) as a final image $I_n$ for viewpoint n.

The apparatus for generating a multi-viewpoint image applies the same scheme as viewpoint n to viewpoints 1 to n−1 to generate final images $I_1, I_2, \ldots, I_{n-1}$ for viewpoints 1 to n−1, respectively.

Meanwhile, the apparatus for generating a multi-viewpoint image warps the left image 410 which is the long-range image at viewpoint n+1 to generate the n+1-viewpoint reference image ($W_{L \to n+1}(L)$) and warps the right image 420 which is the short-range image at viewpoint n+1 to generate an n+1-viewpoint warping image ($W_{R-n+1}(R)$), based on viewpoint n+1. In this case, the apparatus for generating a multi-viewpoint image sets a warping constraint for generating the n+1-viewpoint warping image ($W_{R-n+1}(R)$) based on the n+1-viewpoint reference image ($W_{L \to n+1}(L)$) and generates the n+1-viewpoint warping image ($W_{R-n+1}(R)$) by using a warping equation determined based thereon. Herein, the apparatus for generating a multi-viewpoint image determines a finally generated n+1-viewpoint warping image ($W_{R-n+1}(R)$) as a final image $I_{n+1}$ for viewpoint n+1.

Similarly, the apparatus for generating a multi-viewpoint image applies the same scheme as viewpoint n+1 to viewpoints n+2 to N to generate final images $I_{n+2}, I_{n+3}, \ldots, I_N$ for viewpoints n+2 to N, respectively.

In this case, since both the left image 410 and the right image 420 are considered with respect to consecutive-viewpoint images between the left image 410 and the right image 420, a difference between consecutive viewpoints decreases, and as a result, natural viewpoint switching becomes available. Further, a ghost phenomenon may be prevented from occurring, in which two images overlap with each other due to a difference between the left image 210 and the right image 220 as compared with blending which is an existing multi-view generating postprocessing scheme.

An operation flow of a control device according to the present invention, which is configured as above will be described below in more detail.

Figure 5:
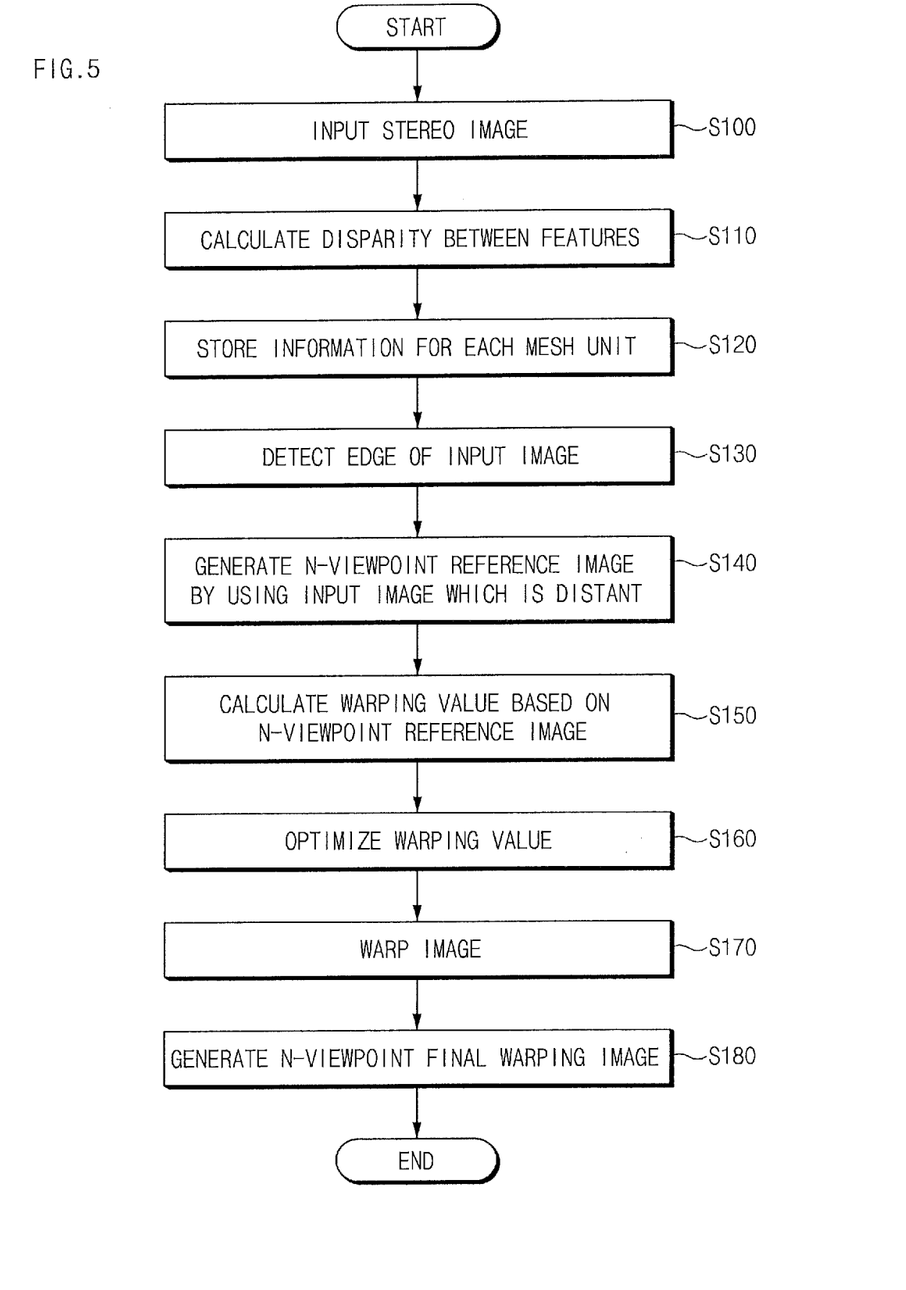
FIGS. 5 and 6 are flow charts illustrating an operational flow of a method for generating a multi-viewpoint image according to another exemplary embodiment of the present invention.

FIG. 5 is a flowchart illustrating an operational flow for a method for generating a multi-viewpoint image according to another exemplary embodiment of the present invention.

Referring to FIG. 5, when the stereo image is input from the camera (S100), the apparatus for generating a multi-viewpoint image detects the features of two images of the input stereo image input during process 'S100', that is, the left image and the right image to calculate a disparity between the features (S110).

The apparatus for generating a multi-viewpoint image segments the left image and the right image into mesh units and detects and stores information for each mesh unit, for example, information on a spot, a line, and a plane (S120) and detects edges of the left image and the right image (S130).

The apparatus for generating a multi-viewpoint image may perform processes 'S120' and 'S130' only with respect to an image which is close to viewpoint n between the left image and the right image in order to generate the final warping image for viewpoint n, but may perform processes 'S120' and 'S130' even with respect to an image which is distant from viewpoint n between the left image and the right image in order to generate the reference image for viewpoint n.

In this case, the apparatus for generating a multi-viewpoint image generates the n-viewpoint reference image by using an image which is distant from viewpoint n by using the information extracted during processes 'S110' to 'S130' (S140). Of course, a process of calculating the disparity between the features and detecting the mesh information and the edge with respect to the image which is distant from viewpoint n between the left image and the right image in order to generate the reference image for viewpoint n may be together performed at the time of generating the n-viewpoint reference image during process 'S140'.

Figure 6:
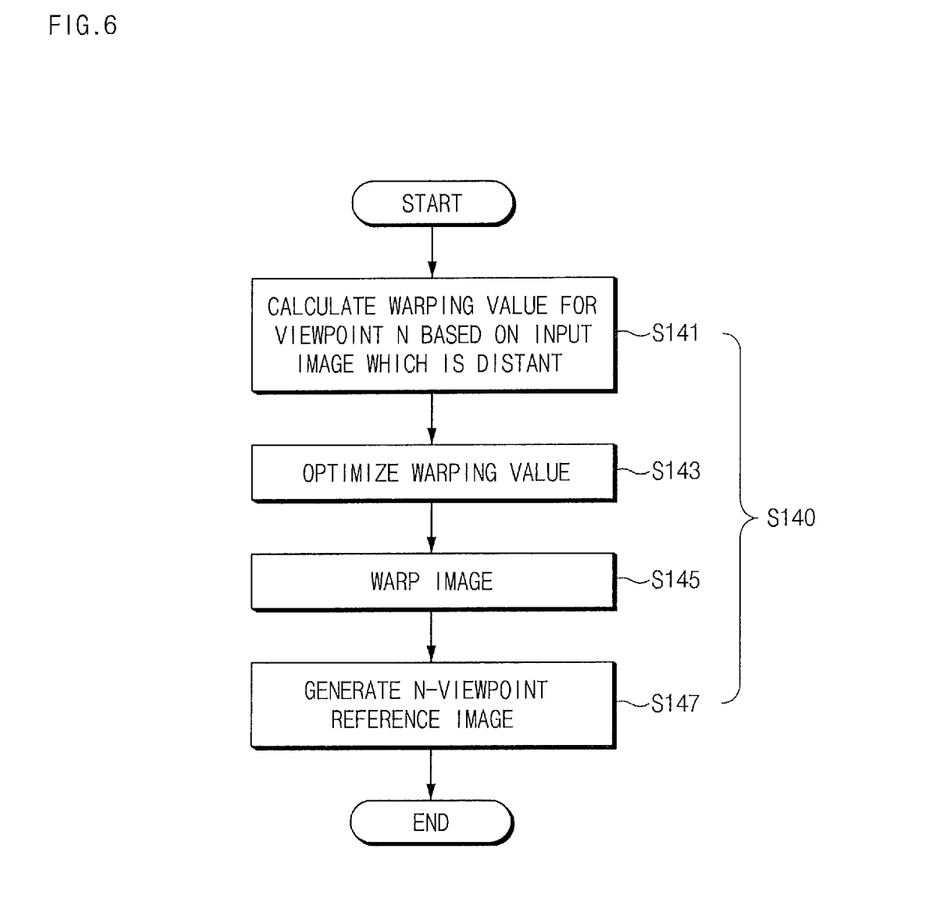

Herein, process 'S140' may be subdivided and described as illustrated in FIG. 6.

Referring to FIG. 6, process 'S140' may include a process of calculating a warping value for warping the image which is distant between the left image and the right image based on viewpoint n at viewpoint n (S141), optimizing the warping value calculated during process 'S141' (S143), a process of warping the input image at viewpoint n by using the warping value optimized during process 'S143' (S145), and a process of generating the image warped during process 'S145' as the n-viewpoint reference image (S147).

The apparatus for generating a multi-viewpoint image may calculate the warping value for warping the image which is close to viewpoint n at viewpoint n again based on the n-viewpoint reference image generated through processes 'S141' to 'S147' (S150) and optimize the warping value calculated through process 'S150' by reflecting constraints generated based on the n-viewpoint reference image generated through process 'S140' (S160).

In this case, the apparatus for generating a multi-viewpoint image warps the image which is close to viewpoint n at viewpoint n by using the warping value optimized during process 'S160' (S170) and generates the image warped during process 'S170' into an n-viewpoint final warping image (S180).

The apparatus for generating a multi-viewpoint image may generate the final warping image through processes 'S110' to 'S180' with respect to consecutive viewpoints between the left image and the right image.

Figure 7:
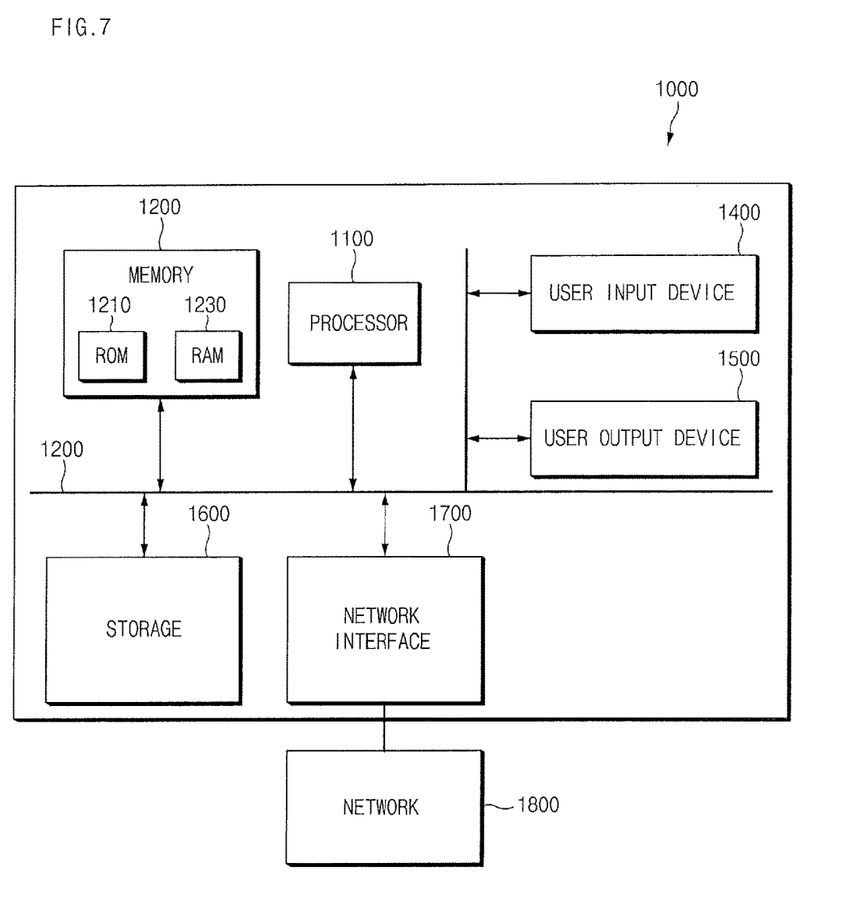
FIG. 7 is a diagram illustrating a computing system to which the apparatus according to the exemplary embodiment of the present invention is applied.

FIG. 7 is a diagram illustrating a computing system to which the apparatus according to the exemplary embodiment of the present invention is applied.

Referring to FIG. 7, the computing system 1000 may include at least one processor 1100, a memory 1300, a user interface input device 1400, a user interface output device 1500, a storage 1600, and a network interface 1700 connected through a bus 1200.

The processor 1100 may be a semiconductor device that processes commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a user terminal. As yet another method, the processor and the storage medium may reside in the user terminal as individual components.

Hereinabove, although the present invention has been described by specific matters such as detailed components, limited exemplary embodiments, and drawings, they have been provided only for assisting in the entire understanding of the present invention. Therefore, the present invention is not limited to the exemplary embodiments. Various modifications and changes may be generated by those skilled in the art to which the present invention pertains within the scope without departing from an essential characteristic of the present invention. The spirit of the present invention should not be defined only by the described exemplary embodiments, and it should be appreciated that claims to be described below and all technical spirits which are evenly or equivalently modified are included in the claims of the present invention.

What is claimed is:

1. An apparatus for generating a multi-viewpoint image, the apparatus comprising:
   a camera photographing a stereo image;
   an image processing unit detecting features from left and right images of the stereo image;
   a reference image generating unit generating a reference image for viewpoint n by warping an image which is distant between the left image and the right image at viewpoint n based on a feature detected between the left image and the right image; and
   a warping image generating unit calculating a warping equation for viewpoint n by using the reference image and generating a final warping image for viewpoint n by using the calculated warping equation,
   wherein the warping image generating unit warps mesh grids configured from an image which is close between the left image and the right image at viewpoint n based on the warping equation and based on the feature detected between the left image and the right image to generate a final warping image for viewpoint n, and
   wherein the reference image generating unit generates an n-viewpoint reference image by using the left image when a relative distance between a position at viewpoint n and the left image is more than 0.5 and generates the n-viewpoint reference image by using the right image when a relative distance between the position at viewpoint n and the right image is more than 0.5 in the case where a relative distance between the left image and the right image is 1.

2. The apparatus of claim 1, wherein the warping image generating unit generates an n-viewpoint final warping image by using the left image when the relative distance between the position at viewpoint n and the left image is less than 0.5 and generates the n-viewpoint final warping image by using the right image when the relative distance between the position at viewpoint n and the right image is less than 0.5 in the case where the relative distance between the left image and the right image is 1.

3. The apparatus of claim 1, wherein the warping image generating unit sets a warping constraint for viewpoint n by using the n-viewpoint reference image and determines a warping equation by reflecting the set warping constraint.

4. The apparatus of claim 3, wherein the warping constraint includes at least one of a transformation degree of meshes calculated from an image which is close from viewpoint n between the left image and the right image, a maintaining degree of correspondence points at the time of warping the corresponding image, a maintaining degree for a spot of an edge area calculated from the corresponding image, temporal consistency at the time of warping the corresponding image, and a similarity between the n-viewpoint reference image and an image after warping.

5. The apparatus of claim 1, wherein the image processing unit calculates a disparity between the features of the left image and the right image.

6. The apparatus of claim 1, wherein the image processing unit segments at least one of the left image and the right image into mesh grid units and extracts at least one information of a spot, a line, and a plane for each segmented mesh.

7. The apparatus of claim 1, wherein the image processing unit detects an edge area from at last one of the left image and the right image to extract line and spot information of the edge area.

8. A method for generating a multi-viewpoint image, the method comprising:
   detecting, when a stereo image is input, features from a left image and a right image of the stereo image;
   generating a reference image for viewpoint n by warping an image which is distant between the left image and the right image at viewpoint n based on a feature detected between the left image and the right image;
   calculating a warping equation for viewpoint n by using the reference image; and
   warping an image which is close between the left image and the right image at viewpoint n based on the warping equation and based on the feature detected between the left image and the right image to generate a final warping image for viewpoint n, and
   wherein in the generating of the reference image for viewpoint n, an n-viewpoint reference image is generated by using the left image when a relative distance between a position at viewpoint n and the left image is more than 0.5 and an n-viewpoint reference image is generated by using the right image when a relative distance between the position at viewpoint n and the right image is more than 0.5 in the case where a relative distance between the left image and the right image is 1.

9. The method of claim 8, wherein in the generating of the final warping image, an n-viewpoint final warping image is generated by using the left image when the relative distance between the position at viewpoint n and the left image is less than 0.5 and an n-viewpoint final warping image is generated by using the right image when the relative distance between the position at viewpoint n and the right image is less than 0.5 in the case where the relative distance between the left image and the right image is 1.

10. The method of claim 8, wherein the calculating of the warping equation for viewpoint n includes setting a warping constraint for viewpoint n by using the n-viewpoint reference image, and the warping equation is determined by reflecting the set warping constraint.

11. The method of claim 10, wherein the warping constraint includes at least one of a transformation degree of meshes calculated from an image which is close from viewpoint n between the left image and the right image, a maintaining degree of correspondence points at the time of warping the corresponding image, a maintaining degree for a feature of an edge area calculated from the corresponding image, temporal consistency at the time of warping the corresponding warping, and a similarity between the n-viewpoint reference image and an image after warping.

12. The method of claim 8, wherein the detecting of the features includes calculating a disparity between the features of the left image and the right image, segmenting at least one of the left image and the right image into mesh grid units and extracting at least one information of a spot, a line, and a plane for each segmented mesh, and detecting an edge area from at last one of the left image and the right image to extract line and spot information of the edge area.

\* \* \* \* \*